(12) United States Patent
Kurkoski

(10) Patent No.: US 6,584,837 B2
(45) Date of Patent: Jul. 1, 2003

(54) METHOD AND APPARATUS FOR DETERMINING ORIENTED DENSITY MEASUREMENTS INCLUDING STAND-OFF CORRECTIONS

(75) Inventor: Philip L. Kurkoski, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 10/004,650

(22) Filed: Dec. 4, 2001

(65) Prior Publication Data

US 2003/0101806 A1 Jun. 5, 2003

(51) Int. Cl.$^7$ ............................. E21B 47/12; G01V 1/40
(52) U.S. Cl. .......................................... 73/152.02; 702/9
(58) Field of Search ......................... 73/152.02, 152.03; 175/45; 250/254, 269.2; 340/855.5; 702/9

(56) References Cited

U.S. PATENT DOCUMENTS

| | | | |
|---|---|---|---|
| 5,012,412 A | 4/1991 | Helm | 364/422 |
| 5,091,644 A | 2/1992 | Minette | 250/254 |
| 5,175,429 A | 12/1992 | Hall, Jr. et al. | 250/262 |
| 5,278,758 A | 1/1994 | Perry et al. | 364/422 |
| 5,397,893 A | 3/1995 | Minette | 250/254 |
| 5,473,158 A | 12/1995 | Holenka et al. | 250/254 |
| 5,513,528 A | 5/1996 | Holenka et al. | 73/151 |
| 5,519,668 A | 5/1996 | Montaron | 367/35 |
| 5,678,643 A | * 10/1997 | Robbins et al. | 175/45 |
| 5,812,068 A | * 9/1998 | Wisler et al. | 340/855.5 |
| 6,272,434 B1 | * 8/2001 | Wisler et al. | 702/9 |
| 6,307,199 B1 | 10/2001 | Edwards et al. | 250/269.3 |
| 2002/0008197 A1 | * 1/2002 | Mickael | 250/269.2 |

* cited by examiner

Primary Examiner—Helen Kwok
Assistant Examiner—Jay Politzer
(74) Attorney, Agent, or Firm—Madan, Mossman & Sriram, P.C.

(57) ABSTRACT

A logging-while-drilling density sensor includes a gamma ray source and at least two NaI detectors spaced apart from the source for determining measurements indicative of the formation density. A magnetometer on the drill collar measures the relative azimuth of the NaI detectors. An acoustic caliper is used for making standoff measurements of the NaI detectors. Measurements made by the detectors are partitioned into spatial bins defined by standoff and azimuth. Within each azimuthal sector, the density measurements are compensated for standoff to provide a single density measurement for the sector. The azimuthal sectors are combined in such a way as to provide a compensated azimuthal geosteering density. The method of the invention may also be used with neutron porosity logging devices.

25 Claims, 5 Drawing Sheets

METHOD AND APPARATUS FOR DETERMINING ORIENTED DENSITY MEASUREMENTS INCLUDING STAND-OFF CORRECTIONS

BACKGROUND OF THE INVENTION

1. Field of the Invention

This invention relates generally to borehole logging apparatus and methods for performing nuclear radiation based measurements. More particularly, this invention relates to a new and improved apparatus for effecting formation density logging in real time using gamma rays in a measurement-while-drilling (MWD) tool.

2. Background of the Art

Oil well logging has been known for many years and provides an oil and gas well driller with information about the particular earth formation being drilled. In conventional oil well logging, after a well has been drilled, a probe known as a sonde is lowered into the borehole and used to determine some characteristic of the formations which the well has traversed. The probe is typically a hermetically sealed steel cylinder which hangs at the end of a long cable which gives mechanical support to the sonde and provides power to the instrumentation inside the sonde. The cable also provides communication channels for sending information up to the surface. It thus becomes possible to measure some parameter of the earth's formations as a function of depth, that is, while the sonde is being pulled uphole. Such "wireline" measurements are normally done in real time (however, these measurements are taken long after the actual drilling has taken place).

A wireline sonde usually transmits energy into the formation as well as a suitable receiver for detecting the same energy returning from the formation. These could include resistivity, acoustic, or nuclear measurements. The present invention is discussed with reference to a density measurement tool that emits nuclear energy, and more particularly gamma rays, but the method of the present invention is applicable to other types of logging instruments as well. Wireline gamma ray density probes are well known and comprise devices incorporating a gamma ray source and a gamma ray detector, shielded from each other to prevent counting of radiation emitted directly from the source. During operation of the probe, gamma rays (or photons) emitted from the source enter the formation to be studied, and interact with the atomic electrons of the material of the formation by photoelectric absorption, by Compton scattering, or by pair production. In photoelectric absorption and pair production phenomena, the particular photons involved in the interacting are removed from the gamma ray beam.

In the Compton scattering process, the involved photon loses some of its energy while changing its original direction of travel, the loss being a function of the scattering angle. Some of the photons emitted from the source into the sample are accordingly scattered toward the detector. Many of these never reach the detector, since their direction is changed by a second Compton scattering, or they are absorbed by the photoelectric absorption process of the pair production process. The scattered photons that reach the detector and interact with it are counted by the electronic equipment associated with the detector.

Examples of prior art wireline density devices are disclosed in U. S. Pat. Nos. 3,202,822, 3,321,625, 3,846,631, 3,858,037, 3,864,569 and 4, 628,202. Wireline formation evaluation tools such as the aforementioned gamma ray density tools have many drawbacks and disadvantages including loss of drilling time, the expense and delay involved in tripping the drillstring so as to enable the wireline to be lowered into the borehole and both the build up of a substantial mud cake and invasion of the formation by the drilling fluids during the time period between drilling and taking measurements. An improvement over these prior art techniques is the art of measurement-while-drilling (MWD) in which many of the characteristics of the formation are determined substantially contemporaneously with the drilling of the borehole.

Measurement-while-drilling logging either partly or totally eliminates the necessity of interrupting the drilling operation to remove the drillstring from the hole in order to make the necessary measurements by wireline techniques. In addition to the ability to log the characteristics of the formation through which the drill bit is passing, this information on a real time basis provides substantial safety advantages for the drilling operation.

One potential problem with MWD logging tools is that the measurements are typically made while the tool is rotating. Since the measurements are made shortly after the drillbit has drilled the borehole, washouts are less of a problem than in wireline logging. Nevertheless, there can be some variations in the spacing between the logging tool and the borehole wall ("standoff") with azimuth. Nuclear measurements are particularly degraded by large standoffs due to the scattering produced by borehole fluids between the tool and the formation.

U.S. Pat. No. 5,397,893 to Minette, the contents of which are fully incorporated herein be reference, teaches a method for analyzing data from a measurement-while-drilling (MWD) formation evaluation logging tool which compensates for rotation of the logging tool (along with the rest of the drillstring) during measurement periods. The density measurement is combined with the measurement from a borehole caliper, preferably an acoustic caliper. The acoustic caliper continuously measures the standoff as the tool is rotating around the borehole. If the caliper is aligned with the density source and detectors, this gives a determination of the standoff in front of the detectors at any given time. This information is used to separate the density data into a number of bins based on the amount of standoff. After a pre-set time interval, the density measurement can then be made. The first step in this process is for short space (SS) and long space (LS) densities to be calculated from the data in each bin. Then, these density measurements are combined in a manner that minimizes the total error in the density calculation. This correction is applied using the "spine and ribs" algorithm and graphs such as that shown in FIG. 1. In the figure, the abscissa 1 is the difference between the LS and SS densities while the ordinate 3 is the correction that is applied to the LS density to give a corrected density using the curve 5.

U.S. Pat. No. 5,513,528 to Holenka et al teaches a method and apparatus for measuring formation characteristics as a function of azimuth about the borehole. The measurement apparatus includes a logging while drilling tool which turns in the borehole while drilling. The down vector of the tool is derived first by determining an angle $\phi$ between a vector to the earth's north magnetic pole, as referenced to the cross sectional plane of a measuring while drilling (MWD) tool and a gravity down vector as referenced in said plane. The logging while drilling (LWD) tool includes magnetometers and accelerometers placed orthogonally in a cross-sectional plane. Using the magnetometers and/or accelerometer measurements, the toolface angle can usually be determined. The angle φ is transmitted to the logging while drilling tool thereby allowing a continuous determination of the gravity down position in the logging while drilling tool. Quadrants, that is, angular distance segments, are measured from the down vector. Referring to FIG. 2, an assumption is made that the down vector defines a situation in which the standoff is at a minimum, allowing for a good spine and rib correction. A drawback of the Holenka method is that the assumption of minimum standoff is not necessarily satisfied, so that the down position may in fact correspond to a significant standoff: without a standoff correction and the results may be erroneous.

In a centralized or stabilized tool, the standoff will generally be uniform with azimuth. Holenka (U.S. Pat. No. 5,513,528) and Edwards (U.S. Pat. No. 6,307,199) also show how azimuthal measurements of density may be diagnostic of bed boundaries intersected by an inclined borehole. In the absence of standoff corrections, this can only be a qualitative measurement and the absolute density measurements may be suspect.

There is a need for a method of determining azimuthal density variations from measurements made by a MWD logging tool. Such a method preferably make corrections for the effects of standoff on the measurements. The present invention satisfies this need.

SUMMARY OF THE INVENTION

The present invention includes a logging-while-drilling method of determining azimuthal variations of density in a borehole. A logging tool is conveyed on a drill collar includes a long spaced (LS) and a short spaced (SS) nuclear sensor. Measurements are made using the nuclear sensors on the logging tool over a time interval while rotating the tool with the drill collar. Standoffs and azimuths corresponding to each of said LS and SS measurements are determined. A plurality of azimuthal sectors is defined around said logging tool. A plurality of standoff bins is defined within each sector. A processor is used for determining from the LS and SS measurements an azimuthal bulk density corresponding to each of said plurality of sectors that is corrected for the standoff of the sensors within that sector. A plurality of compensated sector data is used to generate a geosteering azimuthal compensated density.

In a preferred embodiment of the invention, the standoff measurements are made using an acoustic caliper while the tool azimuth is determined using a magnetometer in conjuriction with borehole survey information. A plurality of spatial bins is defined by azimuthal sector and standoff. Within each spatial bin, a compensated density is determined using the LS and SS measurements and the associated standoff. Compensated density determinations within an azimuthal sector are combined to give an azimuthal bulk density measurement. Relative strike and dip may be determined by analysis of the azimuthal density variation. The azimuthal density measurements may further be combined to give density differences between an "up" and a "down" direction (and "left" and "right"). This difference may be used for controlling the drilling direction or as an indicator of proximity to a nearby interface.

BRIEF DESCRIPTION OF THE FIGURES

For detailed understanding of the present invention, references should be made to the following detailed description of the preferred embodiment, taken in conjunction with the accompanying drawings, in which like elements have been given like numerals and wherein:

FIG. 4b shows the spatial distribution of data bins generated by the example tool of FIG. 4a.

DETAILED DESCRIPTION OF THE INVENTION

Figure 1:
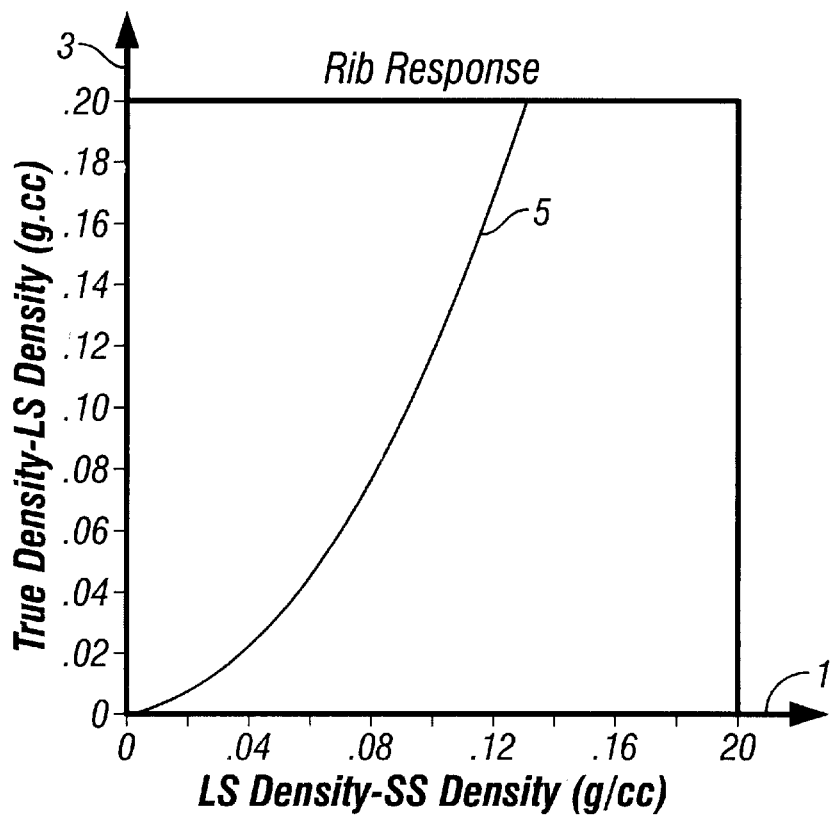
FIG. 1 (PRIOR ART) shows an example of how density measurements made from a long spaced and a short spaced tool are combined to give a corrected density.
Figure 2:
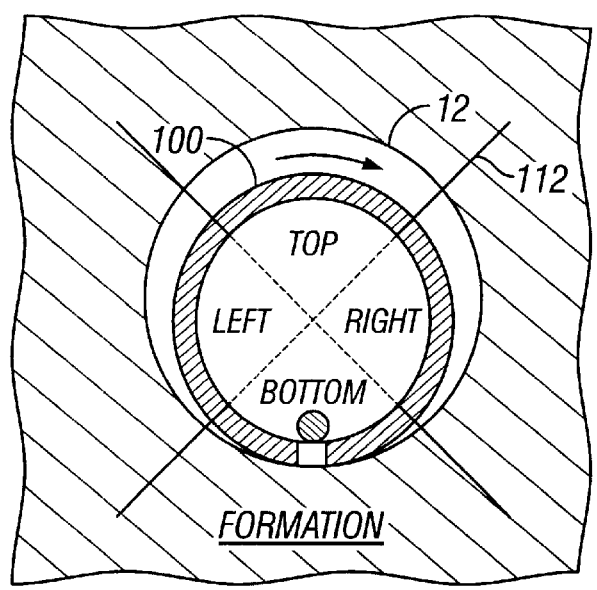
FIG. 2 (PRIOR ART) shows an idealized situation in which a rotating tool in a wellbore has a minimum standoff when the tool is at the bottom of the wellbore.
Figure 3:
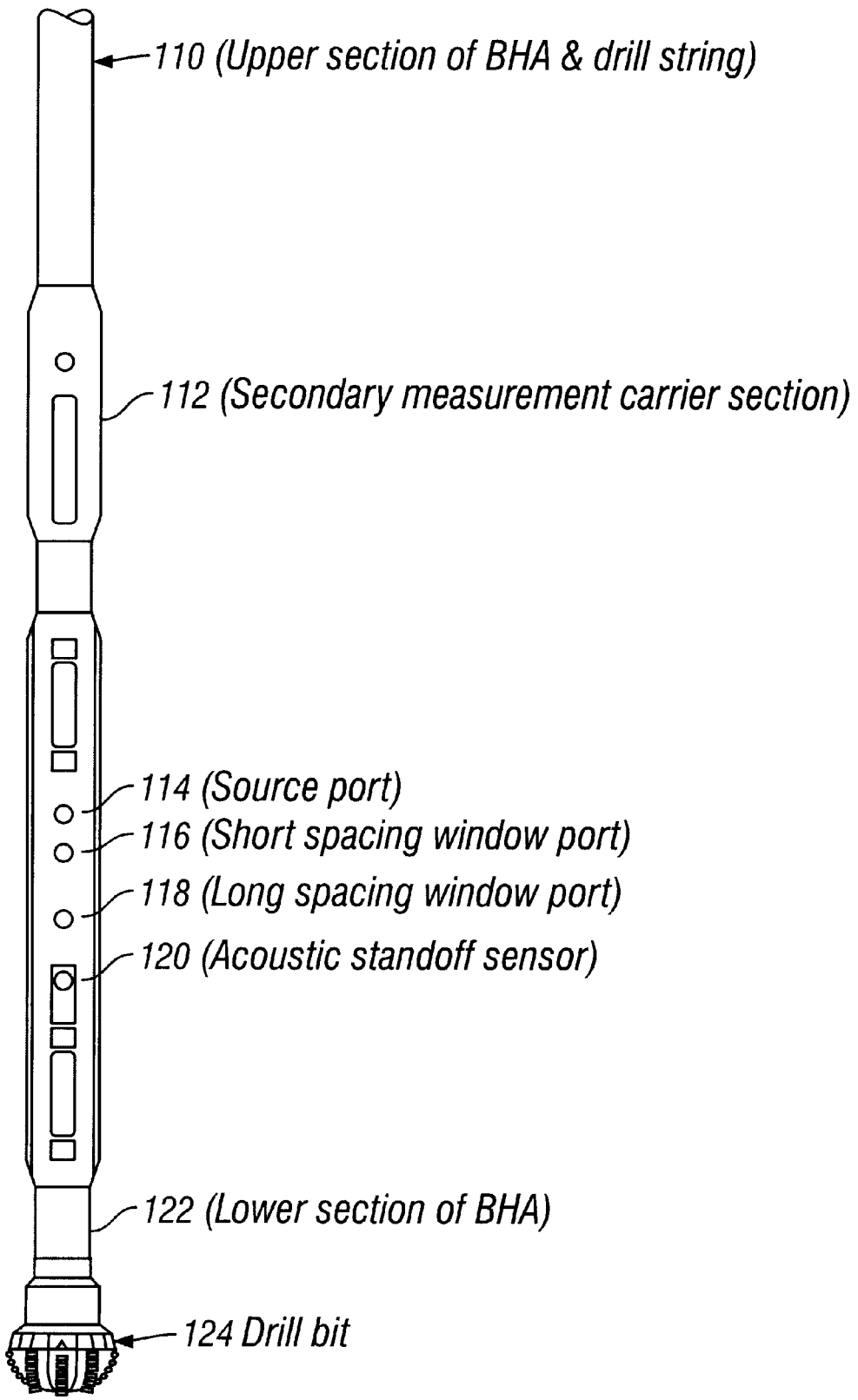
FIG. 3 illustrates the arrangement of the nuclear sensors on a logging-while-drilling device.

Referring now to FIG. 3 a diagram of the basic components for an exemplary gamma-ray density tool. This tool comprises an upper section of a bottom hole assembly including a drill collar 110. The logging tool of the present invention contains a gamma-ray source 114 and two spaced gamma-ray detector assemblies 116 and 118. All three components are placed along a single axis that has been located parallel to the axis of the tool. The detector 116 closest to the gamma-ray source will be referred to as the "short space detector" and the one farthest away 118 is referred to as the "long space detector". Gamma-ray shielding (not shown) is located between detector assemblies 116, 118 and source 114. Windows (ports) open up to the formation from both the detector assemblies and the source. The acoustic caliper(A1) 120 is inline and close to the gamma detectors (LS & SS). A layer of drilling fluid (mud) is present between the formation and the detector assemblies and source. Also shown in FIG. 3 are the lower section of the bottomhole assembly 122 and drill bit 124 and one or more additional sensor assemblies 112.

Figure 4A:
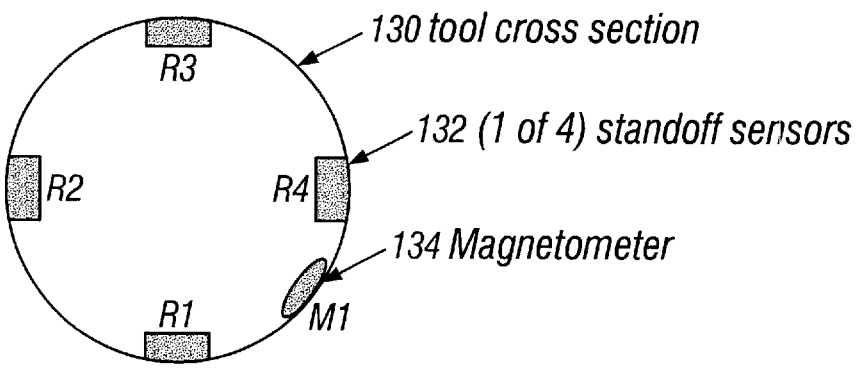
FIG. 4a shows an exemplary configuration of calipers and magnetometer on a downhole logging tool.

FIG. 4a illustrates cross section of a preferred acoustic caliper device. Four sensors R1, R2, R3 and R4 are shown circumferentially disposed around the drill collar with an azimuthal separation of 90°. Each sensor uses acoustic measurements to determine a travel time to the closest point on the borehole. For such a caliper, a commonly output measurement in well logging is the quantity $$S_1 = \frac{2 \cdot (x_1 + x_2 + x_3 + x_4)}{4} + T \quad (1)$$

$$S_{x\text{-}axis} = \frac{2 \cdot (x_1 + x_3)}{2} + T$$

$$S_{y\text{-}axis} = \frac{2 \cdot (x_2 + x_3)}{2} + T$$

where the $x_i$'s are standoff measurements made by the calipers R1, R2, R3 and R4 respectively, T is drill collar (tool) diameter, $S_1$ is a simple caliper, $S_{x\text{-}axis}$ is a simple caliper in the x axis, $S_{y\text{-}axis}$ is a simple caliper in the y axis. The acoustic sensor R1 is in the same azimuthal position as are the gamma ray detector assemblies shown in FIG. 3.

Figure 4B:
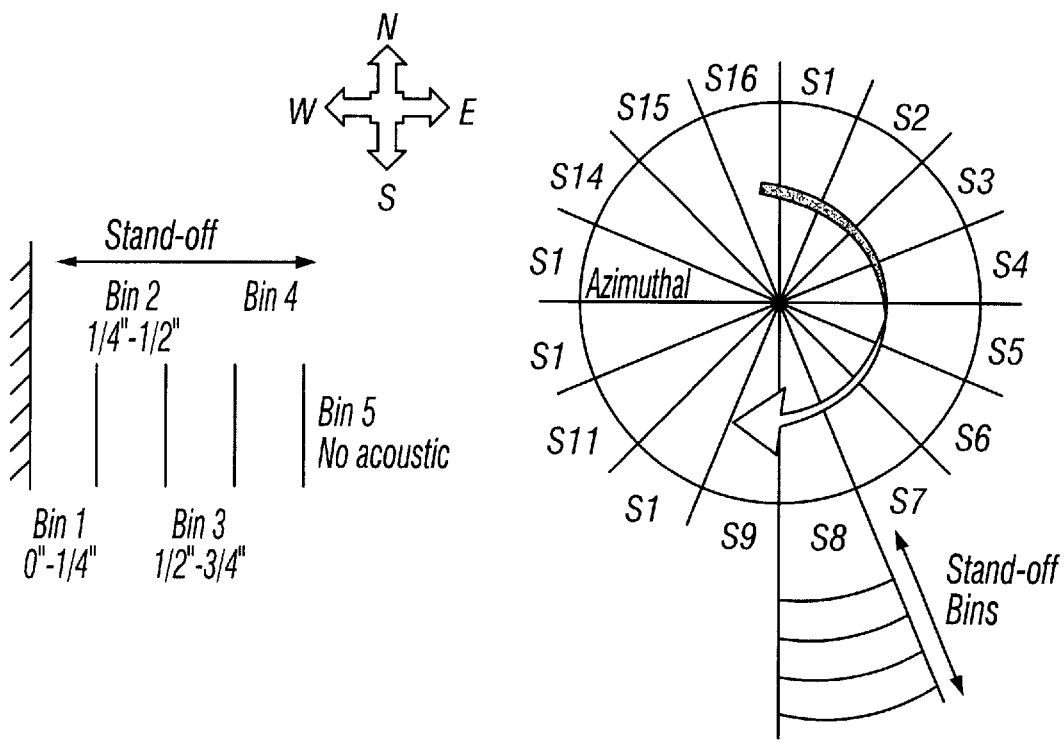

In a preferred embodiment of the present invention, the sensor arrangement includes a magnetometer 134 as shown in FIG. 4a. Magnetometer M1 makes measurements of the direction of the earth's magnetic field. Except for the rare case wherein the borehole is being drilled along the direction of the earth's magnetic field, the magnetometer output in conjunction with borehole survey information can be used to determine the relative orientation of the sensor R1 to the vertical. FIG. 4b illustrates how the data is spatially divided into azimuthal and borehole standoff sectors. Details of borehole surveying methods would be known to those versed in the art and are not discussed here. Additional caliper measurements to those discussed under equation (1) are produced in the present invention.

$$S_2(M_x) = Fn(x_1, x_2, x_3, x_4) + T \qquad (2)$$

$$\text{Borehole Image} = Sum\{S_2(M_x)\}_{x \sim 0 \text{ to } 360}$$

Where $S_2(M_x)$ is the caliper measurement for a particular azimuthal sector 'x'. All four standoff measurements are used to generate an accurate compensated caliper for a particular azimuthal orientation (although this can be done for any number of sensors). Sensor $x_1$ and $x_3$ are compensated by $x_2$ and $x_4$ to provide a more accurate well diameter for each azimuthal orientation. The measurement is duplicated for each azimuthal interval or sector. A borehole image is created (commonly referred to as a potato plot) by plotting these multiple caliper measurements made azimuthally about the borehole covering the range from 0 deg to 360 degrees. $X_1$ is the measurement output of $R_1$, and so forth. $S_2$ is the resultant caliper calculated using multiple compensating acoustic sensors. $S_2(M_x)$ is the resultant caliper for azimuthal position 'x'. T is the tool diameter.

The present invention includes a method for obtaining a binned azimuthal density of the formation. Counts from each NaI (gamma) detector are binned by tool stand-off, then a weighting function recombines them to produce a compensated density (with reduced standoff effects) within each azimuthal sector. This method of binning combined with traditional spine and ribs techniques, provides a good measurement in larger boreholes than would otherwise be possible. It is assumed that for a reasonable percentage of time, the tool will have its detector windows in contact with (or near) the formation wall. Binning compensates for BHA whirl and enlarged hole. The success of the technique depends on having a good detector count rate.

Those versed in the art would recognize that a gamma ray device produces accurate measurements only in a statistical sense and that simply by binning and further subdividing the measurements by azimuth, the statistics may be unreliable if the count within each region is too small. In order to get a reasonably large number of "counts", the present invention includes a gamma ray detector that is larger than prior art detectors. Also detector spacing, shielding, and collimation are selected to maximize response accuracy and minimize statistical effects. This increases the number of counts within each standoff bin and within each azimuthal range.

The up-down-left-right azimuthal densities of the present invention are "binned-azimuth" density measurements. This is different from prior art devices such as that in Minette (standoff binning only), Holenka (azimuthal density variation only) and that taught by Schultz et al, that does a statistical weighting of measurements. This provides a method where the failings of the above prior are addressed. In Minette it is not possible to obtain either a full image of the borehole, or compensate for azimuthal variations of density. In Holenka it is not possible to control the quality of the azimuthal data. This invention disclosed here is capable of providing quality controlled data azimuthally about the borehole which is then used to generate a quality controlled 'compensated density' and a quality controlled 'compensated density image'.

Figure 5:
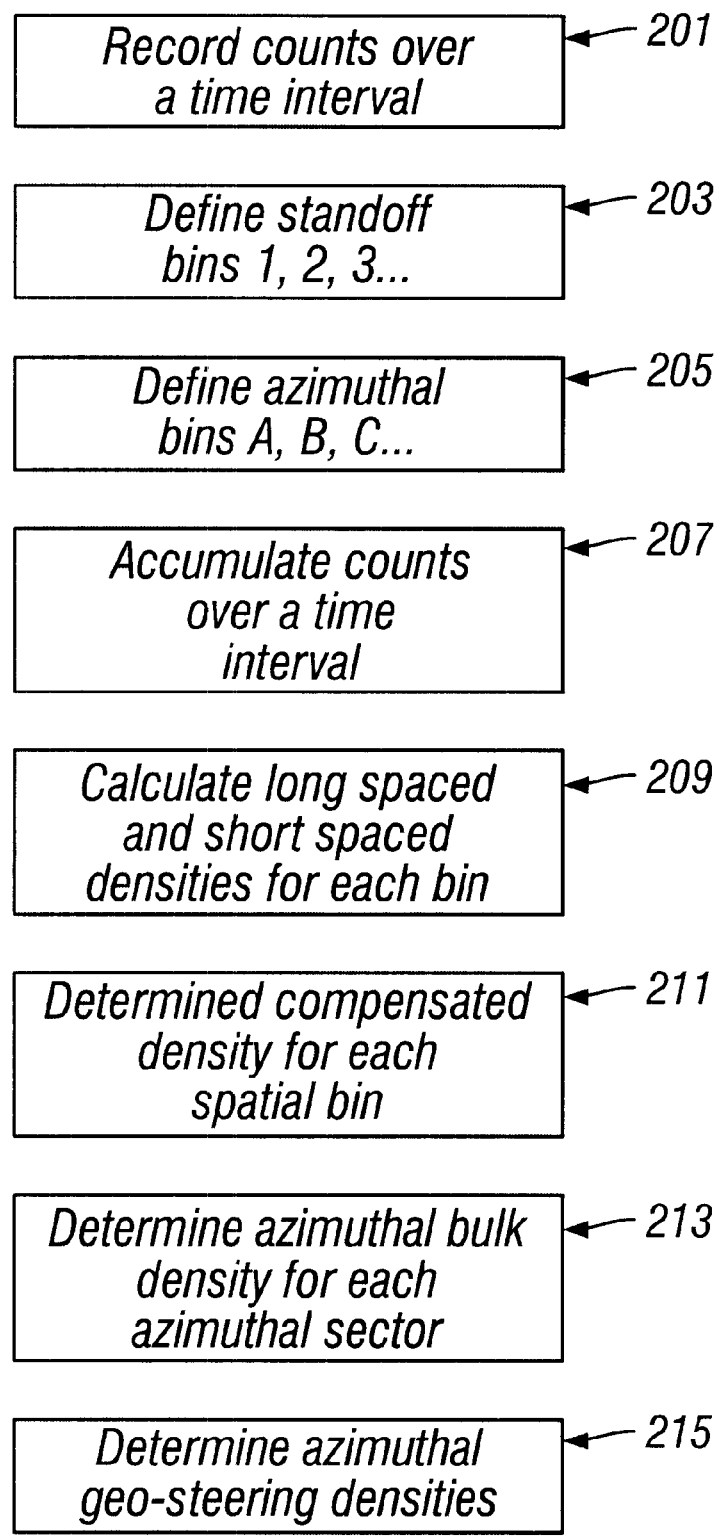
FIG. 5 illustrates some of the steps used in the method of the present invention.

Referring now to FIG. 5, a flow chart of a preferred embodiment of the invention is shown. Acquisition of data is initiated at 201. A plurality of standoff bins, labeled 1, 2, 3 . . . etc. are defined. In a preferred embodiment of the invention, the bins may be ¼" (6.35 mm) in size, so that bin 1 would comprise samples with a standoff of 0 to ¼", bin 2 would comprise samples with a standoff of ¼' to ½", etc. The actual number and width of bins is determined based on statistical considerations that would be known to those versed in the art. Similarly, at 205, a plurality of azimuthal sectors or bins A, B, C, . . . is defined. Typically, each sector may cover a range of 45° in azimuth, so that sector A would accordingly comprise samples within an azimuth range of 0° to 45°, bin B would comprise samples within an azimuth range of 45° to 90°, etc., for a total of eight azimuths. Other azimuthal bin widths could also be selected.

As the tool is rotating, counts are accumulated in memory over a selectable time interval 207, for example 10 seconds. The time spent in each individual standoff bin and azimuthal bin will be unique, and represent a fraction of the total accumulation time. For example, bin 1A would comprise samples with a standoff between 0 to ¼" and having an azimuthal range of 0° to 45°, bin 3D would comprise samples with a standoff range of ½ to ¾ and an azimuth range of 135° to 180°. The bins such as 1A, 1B, . . . are referred to hereafter as spatial bins.

A long spaced density (LS) is calculated for each spatial bin 209 using prior art methods. As an example, $LS_{(1A)}$ is a long spaced density for spatial bin 1A, $LS_{(2A)}$ is a long spaced density for spatial bin 2A, etc. In a similar manner, a short spaced density is calculated for each spatial bin as $SS_{(1A)}$, $SS_{(2A)}$ . . . etc.

Using the determined LS and SS for each of the spatial bins, a compensated density (BD) is determined 211 for each spatial bin using the 'spine and ribs' algorithm. Thus, $$BD_{(1A)} = f_1[LS_{(1A)}, SS_{(1A)}]$$
$$BD_{(2A)} = f_2[LS_{(2A)}, SS_{(2A)}]$$
$$BD_{(3A)} = f_3[LS_{(3A)}, SS_{(3A)}] \ldots \text{etc.} \qquad (4)$$

where the $f_i$s are suitable functions. The function would depend upon the standoff bin index and based on the 'spine and ribs' algorithm.

Having determined a compensated density for each spatial bin, the determined values are averaged over the bins within each azimuthal sector to give an azimuthal bulk density $ABD_{(A)}$ 213 where $_{(A)}$ indicates the azimuthal sector. This is given as a weighted sum:

$$ABD(A) = \sum_j w_j BD(jA) \qquad (5)$$

where the $w_j$ are weighting factors determined by error minimization equations and the fractional time contribution for a particular standoff. The purpose of this weighting is to minimize the effect of standoff on the determined density for each azimuthal sector. Each $ABD_{(A)}$ output is presented as a color gradient, and the sum of all $ABD_{(A)}$ outputs over all the azimuthal sectors produces an azimuthal density image of the borehole. This is a novel aspect of the present invention compared to, say Holenka, wherein counts within each azimuthal sector are simply accumulated and a spine and rib algorithm is applied independent of standoff or data quality.

The size of each standoff bin and of each azimuthal sector is governed by the statistical considerations discussed above, i.e., to get a reasonable number of counts in each spatial bin without losing precision.

In addition to the presentation of a compensated image, a geosteering azimuthal bulk density (GABD) is calculated for four specified groups of azimuths (up, down, left, right). Those versed in the art would recognize that the density logging tool can sense about 1.5" into the formation. Significant differences between the up and down densities in a horizontal borehole are indicative of formation boundaries or fluid contacts: Such a determination is particularly useful in geosteering while drilling a horizontal borehole.

Having determined a compensated density using standoff sorted data for each azimuthal sector the sectors are further combined to provide a geosteering output. Sectors are combined using a weighting scheme to produce an 'up', 'down', 'left' or 'right' density.

$$GABD_{(z)} = \text{sum}\{w_j ABD_{(A)}\}$$

Where $(_z)$ indicates identifies "up, down, left, or right", $w_j$ are weighting factors determined by error minimization equations and the fractional time contribution for a particular sector, and $(_A)$ indicates a particular sector. The range of $(_A)$ is determined by $(_z)$ and the weighting factor $w_j$.

Figure 6:
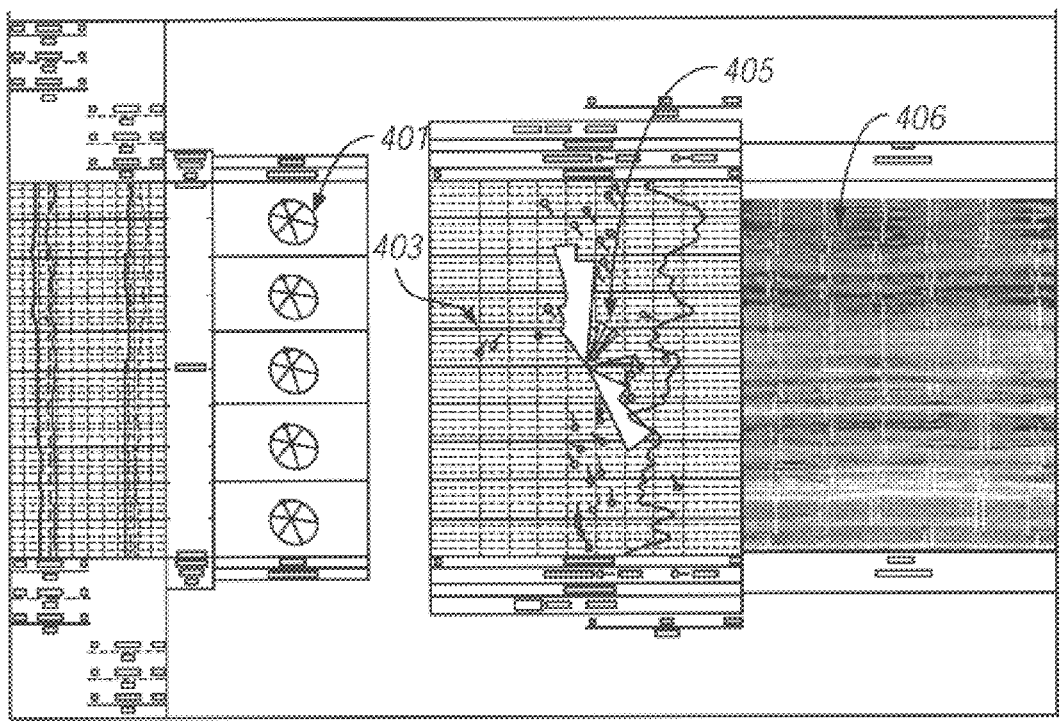
FIG. 6 is an exemplary display of the output of the present invention.

Turning next to FIG. 6, an exemplary display using the method of the present invention is shown. The vertical axis is drilling depth and the panel 407 shows an azimuthal density plot over a depth interval in a borehole. The azimuths have been "unwrapped" in the panel, so that the left edge and the right edge of the panel correspond to the same azimuth. This is obtained by suitable interpolation of the azimuthal bulk density ABD. Those versed in the art would recognize the possibility of interpreting this plot in a manner similar to that used in interpretation of a resistivity image plot. In particular, horizons intersecting the borehole would appear as sinusoids that can be interpreted to give a strike and dip direction.

The panel adjacent to the azimuthal density display shows individual picks of dip and azimuth as the "pins" 403 while the rosette 405 is a summary of the information seen in the display panel 407. It can be seen that the dips in the upper half of the panel are greater than the dips in the lower half of the panel, suggestive of an unconformity in the middle of the panel.

The panel 401 in FIG. 6 shows five different displays summarizing the caliper data averaged over five depths. The circular object represents the borehole while the star-shaped character in the circle represents the distances in six different azimuths of the borehole wall from the center of the logging tool. This serves as a quality check on the interpreted dips and azimuths in FIG. 6 as large deviations from circularity would mean that the results are suspect.

The method of the present invention may also suitable for use with other types of nuclear sensors, such as those contained within a neutron porosity tool (Li6 or He3 detectors measure neutron flux). There are several examples of neutron porosity tools in the market place. Neutron porosity tools are very susceptible to borehole size and tool standoff. A prior art processing technique that minimizes borehole and tool standoff effects on the neutron porosity measurement is disclosed, for example, in U.S. Pat. No. 5,767,510, to Evans. This patented technique uses the different depths of investigation, (established by detector placement), of the long spacing and the short spacing detectors, to generate a compensated porosity measurement, similar to the "spine and ribs" technique, as is done for a gamma density tool. No direct measurement of borehole size or tool standoff is used.

Within the method of this invention, the porosity tool position and borehole shape information is available and used in a similar manner as to the gamma density processing technique discussed above. Individual neutron detector measurements are spatially divided (binned for standoff and sectored for azimuth) into multiple data bins. The number of standoff bins and azimuthal sectors defined is a reduced set, as compared to those defined for the gamma density measurement. This is a requirement due to the reduced count rate as compared to a gamma detector count rate. The long spacing and short spacing measurement for each data bin is processed using either a simple ratio, or a typical spine and ribs technique. The individual bin results are combined as detailed in the method of this invention.

While the foregoing disclosure is directed to the preferred embodiments of the invention, various modifications will be apparent to those skilled in the art. It is intended that all variations within the scope and spirit of the appended claims be embraced by the foregoing disclosure.

What is claimed is:

1. A method of logging of an earth formation comprising:
   (a) conveying a logging tool into a borehole in the earth formation and rotating the tool therein;
   (b) making a plurality of long spaced (LS) and short spaced (SS) measurements of a parameter of interest of the earth formation using nuclear sensors on the logging tool over a time interval during continuing rotation of the tool;
   (c) determining a standoff associated with each of said LS and SS measurements;
   (d) determining an azimuth associated with each of said LS and SS measurements;
   (e) defining a plurality of azimuthal sectors around said logging tool; and
   (f) determining from said plurality of LS and SS measurements and their associated standoff and azimuth, an azimuthal bulk density corresponding to each of said plurality of sectors, said azimuthal bulk density corrected for standoff using a correction determined at least in part by said standoff.

2. The method of claim 1 wherein determining said standoff further comprises using a caliper on the logging tool.

3. The method of claim 2 wherein said caliper is an acoustic caliper.

4. The method of claim 2 wherein said caliper comprises an acoustic sensor azimuthally aligned with said nuclear sensors.

5. The method of claim 1 wherein determining said azimuth further comprises using an orientation sensor on the logging tool.

6. The method of claim 5 wherein the orientation sensor comprises a magnetometer.

7. The method of claim 1 wherein determining said azimuthal bulk density further comprises:
   (i) defining a plurality of standoff bins associated with each of said azimuthal sectors,
   (ii) using said standoff bins and said azimuthal sectors and defining therefrom a plurality of spatial bins,
   (iii) determining a compensated density associated with each of said plurality of spatial bins, and
   (iv) determining a weighted sum of said compensated densities for each spatial bin within each azimuthal sector.

8. The method of claim 7 wherein determining said compensated density further comprises determining a LS density from the LS measurements and a SS density from the SS measurements within each of said plurality of spatial bins.

9. The method of claim 8 wherein determining said compensated density further comprises combining the LS and SS density using a spine and rib algorithm.

10. The method of claim 1 wherin the number of azimuthal sectors is determined at least in part by counting rate statistics and precision requirements.

11. The method of claim 1 wherein the plurality of azimuthal sectors is at least four.

12. The method of claim 1 wherein the plurality of standoff bins wherein said plurality is determined at least in part by counting rate statistics and precision requirements.

13. The method of claim 1 wherein the plurality of standoff bins is at least two.

14. The method of claim 1, wherein said time interval is determined at least in part by counting rate statistics and precision requirements.

15. The method of claim 1 wherein said time interval is at least 5 seconds.

16. The method of claim 1 further comprising combining adjacent ones of said plurality of azimuthal bulk densities and determining therefrom at least a bulk density in at least an up direction and a bulk density in a down direction.

17. The method of claim 16 wherein said combining adjacent ones of said plurality of azimuthal bulk densities further comprises using error minimization routines.

18. The method of claim 16 wherein said logging tool is conveyed on a drill collar, the method further comprising using said up and down densities for controlling a direction of drilling of a drill bit carried by the drill collar.

19. The method of claim 16 further comprising using a difference between said up and down densities as an indicator of proximity to an interface outside the borehole.

20. The method of claim 1 further comprising determining from said plurality of azimuthal bulk densities a relative strike and a relative dip direction of the earth formation relative to the logging tool.

21. The method of claim 1 wherein said nuclear sensors are selected from the group consisting of (i) gamma ray detectors, and, (ii) neutron detectors.

22. A method of logging of an earth formation comprising:
   (a) using a drill collar for conveying a logging tool into a borehole in the earth formation;
   (b) using nuclear sensors on the logging tool for making a plurality of long spaced (LS) and short spaced (SS) measurements of a parameter of interest of the earth formation, said measurements being made during continuing rotation of the drill collar;
   (c) using an acoustic caliper on the logging tool for determining a standoff corresponding to each of said LS and SS measurements;
   (d) partitioning the LS and SS measurements into a plurality of spatial bins, each said spatial bin corresponding to one of a plurality of azimuthal sectors and one of a plurality of standoff bins; and
   (e) using a downhole processor for partitioning said LS and SS measurements into said spatial bins and determining therefrom an azimuthal bulk density corresponding to each of said plurality of sectors, said azimuthal bulk density corrected for standoff errors using a correction determined at least in part by said standoffs.

23. An apparatus for logging while drilling of a borehole in an earth formation comprising:
   (a) a drill collar carrying a drill bit for drilling the borehole;
   (b) at least two nuclear sensors carried by the drill collar for making measurements of a parameter of interest of the earth formation;
   (c) a caliper on the drill collar for measuring a standoff of the at least two sensors relative to a wall of the borehole;
   (d) a processor for using measurements made by the at least two nuclear sensors and determining therefrom an azimuthal variation of the parameter of interest corrected for standoff of the sensors by applying, a correction based at least in part on said standoff.

24. The apparatus of claim 23 wherein the at least two nuclear sensors are selected from the group consisting of (i) gamma ray detectors, and, (ii) neutron detectors.

25. A method of logging of an earth formation comprising:
   (a) conveying a logging tool into a borehole in the earth formation and rotating the tool therein;
   (b) making a plurality of long spaced (LS) and short spaced (SS) measurements of a parameter of interest of the earth formation using nuclear sensors on the logging tool over a time interval during continuing rotation of the tool;
   (c) measuring a standoff associated with each of said LS and SS measurements;
   (d) determining an azimuth associated with each of said LS and SS measurements;
   (e) defining a plurality of azimuthal sectors around said logging tool; and
   (f) determining from said plurality of LS and SS measurements and their associated standoff and azimuth, an azimuthal bulk density corresponding to each of said plurality of sectors, said azimuthal bulk density corrected for standoff using a correction determined at least in part by said standoff.

* * * * *